United States Patent
Bugenhagen

(10) Patent No.: US 8,718,046 B2
(45) Date of Patent: *May 6, 2014

(54) SYSTEM AND METHOD FOR MONITORING A CONNECTION OF AN END-USER DEVICE TO A NETWORK

(75) Inventor: Michael K. Bugenhagen, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/450,182

(22) Filed: Apr. 18, 2012

(65) Prior Publication Data

US 2012/0201360 A1    Aug. 9, 2012

Related U.S. Application Data

(63) Continuation of application No. 11/583,765, filed on Oct. 19, 2006, now Pat. No. 8,194,643.

(51) Int. Cl.
*H04L 12/66* (2006.01)
*H04L 12/28* (2006.01)

(52) U.S. Cl.
USPC ........... 370/352; 370/230; 370/231; 370/236; 370/351; 370/395.21

(58) Field of Classification Search
USPC ............. 370/230, 231, 236, 351, 352, 395.21
See application file for complete search history.

(56) References Cited

U.S. PATENT DOCUMENTS

| | | | | |
|---|---|---|---|---|
| 5,883,819 A | * | 3/1999 | Abu-Amara et al. | 716/106 |
| 6,141,341 A | * | 10/2000 | Jones et al. | 370/352 |
| 6,675,211 B1 | * | 1/2004 | Mamaghani et al. | 709/224 |
| 6,690,651 B1 | * | 2/2004 | Lamarque et al. | 370/252 |
| 6,690,929 B1 | * | 2/2004 | Yeh | 455/406 |
| 6,839,356 B2 | * | 1/2005 | Barany et al. | 370/401 |
| 7,729,489 B2 | * | 6/2010 | Lee et al. | 379/212.01 |
| 2003/0100308 A1 | * | 5/2003 | Rusch | 455/445 |
| 2004/0089043 A1 | * | 5/2004 | Meinig | 72/86 |
| 2005/0238026 A1 | * | 10/2005 | Wu et al. | 370/395.2 |
| 2006/0072542 A1 | * | 4/2006 | Sinnreich et al. | 370/351 |

OTHER PUBLICATIONS

Ng, See Leng et al "End-to-end Based QoS provisioning in an All-IP Network" Sep. 23-26, 2005.*
Manousos, Michael et al "Voice-Quality Monitoring and Control for VOIP" Jul. 2005.*
www.sipcenter.com "What is Sip?" Jun. 2001.*

(Continued)

*Primary Examiner* — Dang T Ton
*Assistant Examiner* — Robert M Morlan
(74) *Attorney, Agent, or Firm* — Patton Boggs LLP

(57) ABSTRACT

A method of monitoring the connection of a first end-user device to a network includes determining the amount of bandwidth present, tracking the amount of bandwidth in use by different classes of traffic, and tracking performance of the connection to detect when a threshold crossing has been reached. The method also includes transmitting a query to the first end-user device in response to the determined reaching of the threshold, the query requesting from a user of the first end-user device a communication action to perform based on the threshold being reached. The method further includes changing the communications session between the first end-user device and the network in accordance with the received communication action.

17 Claims, 14 Drawing Sheets

(56) References Cited

OTHER PUBLICATIONS

Pangalos, P.A. et al "End-to-end SIP based real time application adaptation during unplanned vertical handovers," Global Telecommunications Conference, 2001. GLOBECOM '01. IEEE, vol. 6, No., pp. 3488-3493 vol. 6, 2001.*

Yoshimura, T. et al. "Rate and robustness control with RTP monitoring agent for mobile multimedia streaming," Communications, 2002. ICC 2002. IEEE International Conference on, vol. 4, No., pp. 2513-2517 vol. 4, 2002.*

J. Rosenburg et al "SIP: Session Initiation Protocol" IETF RFC 3261, Jun. 2002.*

Newton, Harry "Newton's Telecom Dictionary" 23rd Edition 2007.*

* cited by examiner

Database Entry 1110

Home Computer

Applications
    Bandwidth
    Protocols
    User
    Preferences

Work Computer

Applications
    Bandwidth
    Protocols
    User
    Preferences

Cellular Telephone

Applications
    Bandwidth
    Protocols
    User
    Preferences

Personal Digital Assistant

Applications
    Bandwidth
    Protocols
    User
    Preferences

FIGURE 11

SYSTEM AND METHOD FOR MONITORING A CONNECTION OF AN END-USER DEVICE TO A NETWORK

CROSS-REFERENCE TO RELATED APPLICATIONS

This application is a continuation of U.S. patent application Ser. No. 11/583,765 filed on Oct. 19, 2006 now U.S. Pat. No. 8,194,643, entitled System and Method for Monitoring the Connection of an End-User to a Remote Network, the entire teachings of which are incorporated herein by reference.

BACKGROUND

The invention relates to telecommunications, and in particular, to a system and method for monitoring the connection state of an end-user to a remote network The recent increase in the availability and popularity of real-time voice, video, and data services has presented new challenges to providers of such services. More particularly, the state of the connection of end-user devices to a network frequently determines the quality of service enjoyed by an end-user during a service session.

SUMMARY

Various embodiments of the present invention offer improvements over prior art systems for initiating and controlling communications sessions.

In one embodiment, a method of monitoring a link in a network between a first end-user device and a network is disclosed. The method includes determining that a threshold has been reached based on performance data, the threshold associated with a decline in quality of a connection between the first end-user device and the network. The method also includes transmitting a query to the first end-user device in response to the determined reaching of the threshold, the query requesting from a user of the first end-user device a communication action to perform based on the threshold being reached. The method further includes changing the communications session between the first end-user device and the network in accordance with the received communication action.

BRIEF DESCRIPTION OF THE DRAWINGS

FIG. 11 illustrates one embodiment of an entry in a network database associated with an end-user that is implemented according to the teachings of the present invention.

DETAILED DESCRIPTION OF THE DRAWINGS

FIGS. 1-14 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
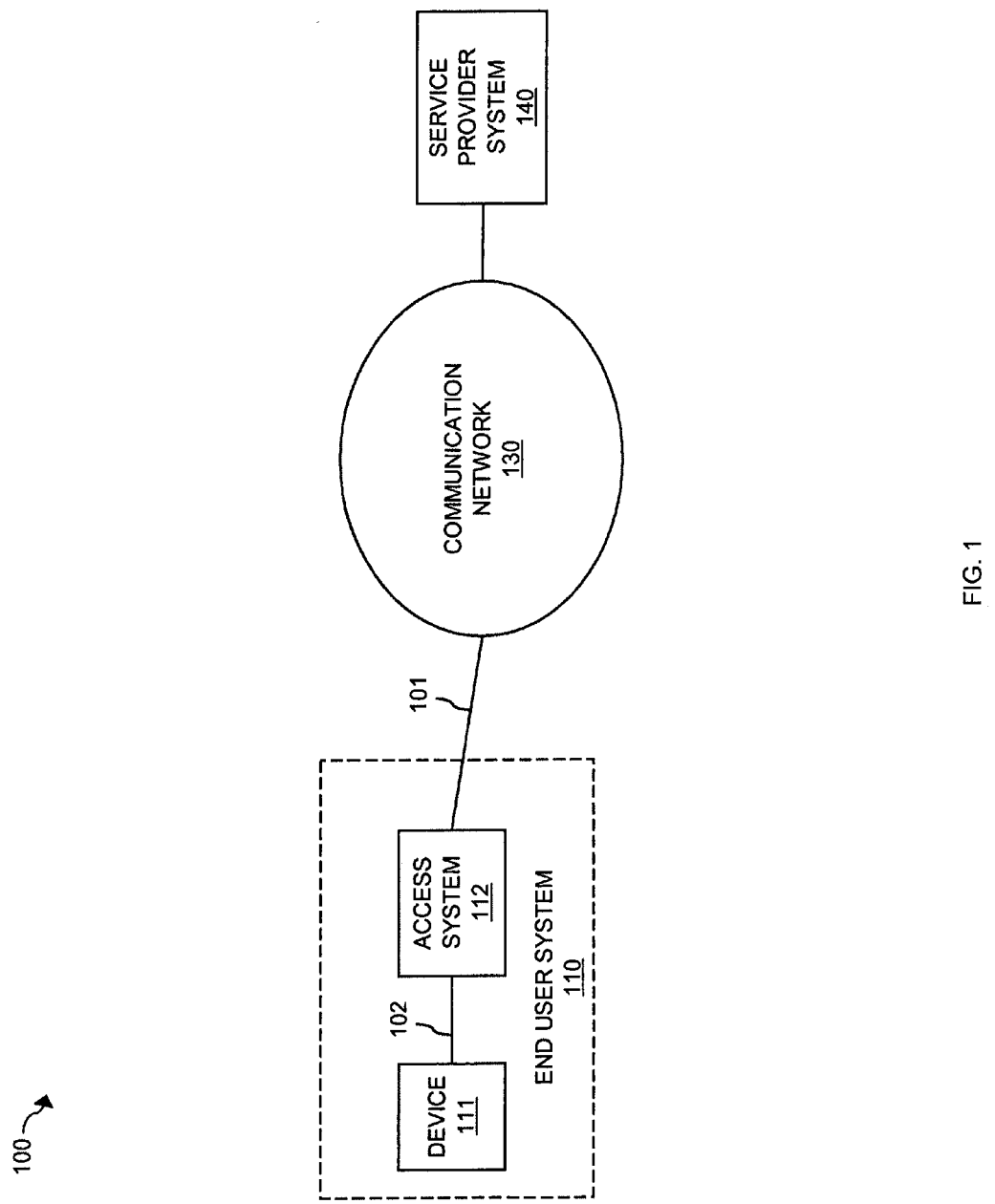
FIG. 1 illustrates a communication network in an embodiment of the invention.

FIG. 1 illustrates communication network 100 in an embodiment of the invention. Communication network 100 includes end-user system 110, communication network 130, and service provider system 140. End-user system 110 includes access system 112 and device 111. Access system 112 is in communication with communication network 130. Likewise, service provider system 140 is in communication with communication network 130.

Access system 112 could be any system capable of providing device 111 with access to services provided over communication network 130. Service provider system 140 could be any system capable of providing services to device 111. Device 111 could be any type of device capable of communicating with service provider system 140 through access system 112 and communication network 130, such as a personal computer, a mobile phone, or a personal digital assistant. Examples of services could include voice, video, and data services, as well as other types of service. It should be understood that communication network 130 could be any network or collection of networks capable of transporting communications between access system 112 and service provider system 140.

Figure 2:
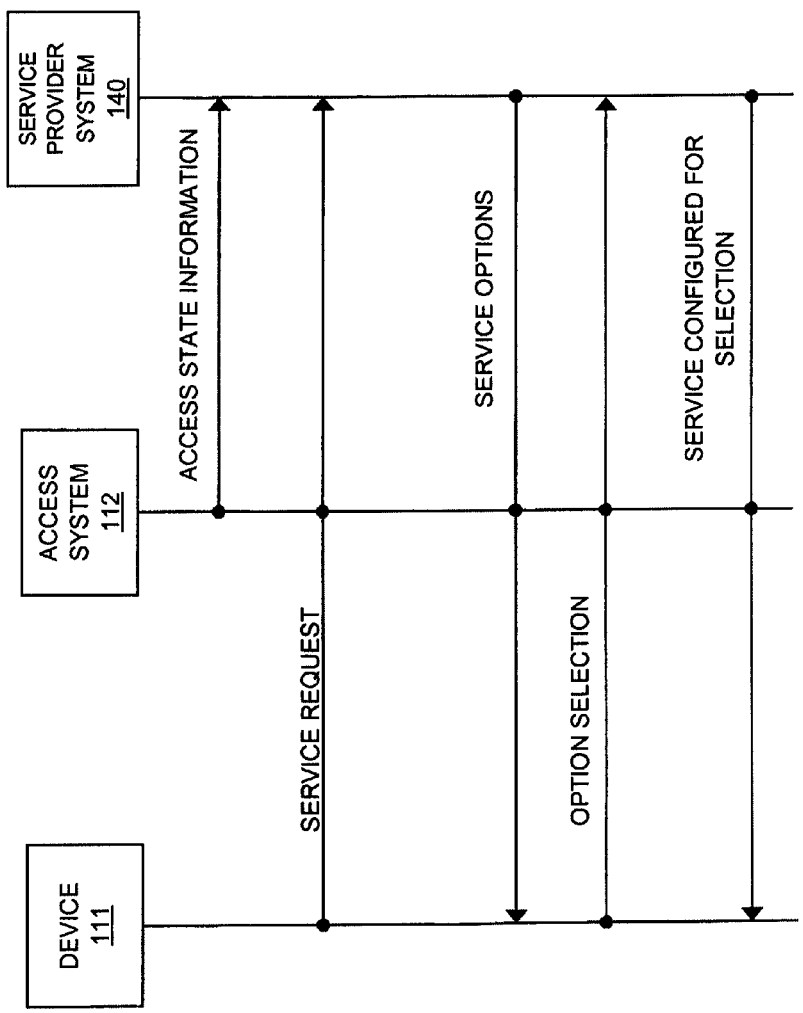
FIG. 2 illustrates the operation of a communication network in an embodiment of the invention.

Device 111 is in communication with access system 112 by communication link 102. Communication link 102 could be a wired or wireless link such as a CAT-5 cable, USB cable, or WiFi wireless connection. Access system 112 is in communication with communication network by communication link 101. Communication link 101 could also be a wireline or wireless link For example, communication link 101 could comprise a DSL connection, fiber connection, or a cable connection, as well as any other type of wireline access link In another example, communication link 101 could comprise a CDMA, MMDS, EVDO, or WiMax link, as well as any combination thereof or any other type of wireless access link FIG. 2 illustrates the operation of communication network 100. In operation, device 111 communicates with access system 112 to initiate and setup an access link to communication network 130. Upon establishing access to communication network 130, access system 112 monitors communication link 101 for access state information, including line state information and transmission state information. For example, access system 112 measures the total bandwidth of link 101 and the amount of available bandwidth on link 101. Other metrics include jitter, delay, and reserved bandwidth. As illustrated by FIG. 2, access system 112 may transmit the access state information to service provider system 140.

After access system 112 has transmitted the access state information to service provider system 140, device 111 initiates a service request to service provider system 140 for a service. Service provider system 140 responsively processes the service request, along with the access state information, to determine service options for the requested service. The service options could be determined based on the access state information. Service provider system 140 then transfers the service options to device 111 for selection. A user operatively selects one of the options from the service options and device 111 returns the selected option to service provider system 140. Service provider system 140 responsively provides the service configured for the option selection.

Figure 3:
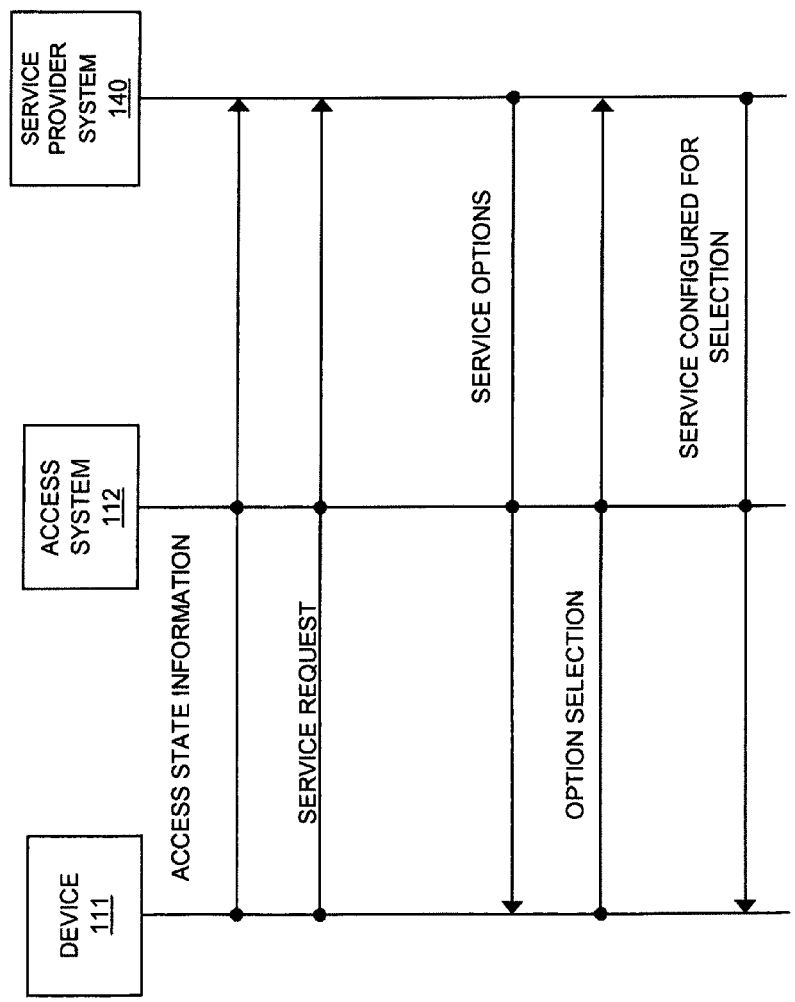
FIG. 3 illustrates the operation of a communication network in an embodiment of the invention.

FIG. 3 illustrates the operation of communication network 100 in an embodiment of the invention. In operation, device 111 communicates with access system 112 to gain access to communication network 130. Upon establishing the access, device 111 monitors link 102. For example, device 111 could monitor for the total bandwidth available or actual usable bandwidth over link 102. Device 111 could also monitor general performance statistics, such as packet jitter and packet delay. The performance results, such as jitter or delay, could be indicative of the performance of link 102, link 101, or communication network 130. Importantly, device 111 determines by monitoring and detection the state of the access at device 111, regardless of whether any degradation is caused by link 102, link 101, or communication network 130. Device 111 then generates access state information pertaining to the health or status of the access as perceived by device 111 and transmits the access state information to service provider system 140.

Next, device 111 transmits a service request for a service to service provider system 140 identifying the service and device 111. Service provider system 140 receives the service request from device 111 and responsively provides service options to device 111. Device 111 provides the options to a user for selection, such as via a graphical user interface. The user selects one of the service options and device 111 transmits the selected option to service provider system 140. Upon receiving the selected option, service provider system 140 provides the requested service configured for the option selection.

Figure 4:
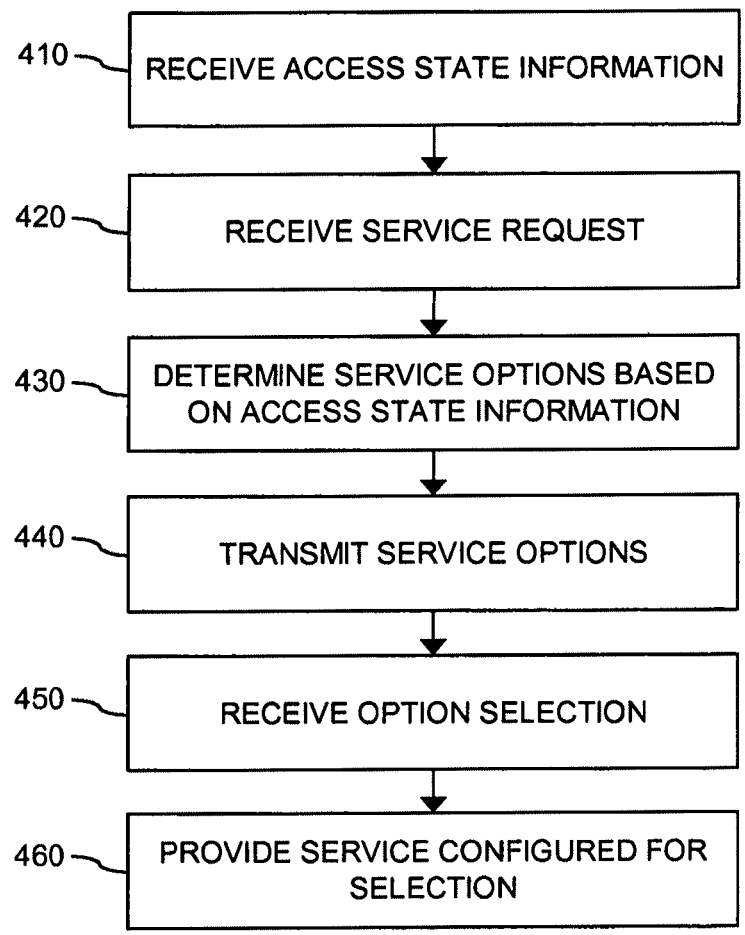
FIG. 4 illustrates the operation of a service provider system in an embodiment of the invention.

FIG. 4 illustrates the operation of service provider system 140 in an embodiment. To begin, service provider system 140 receives access state information indicate the state of an access link between an access system and a communication network (Step 410). The state information could include, for example, total bandwidth or available bandwidth, as well as other types of state information. Next, service provider system 140 receives a service request from a device whereby the device is provided access by the access system (Step 420). Service provider system 140 processes the service request with the access state information to determine service options based on the access state information (Step 430). Upon determining the service options, service provider system 140 transfers the service options to the device (Step 540). A user operatively selects one of the options and the device returns the selected option to service provider system 140. Service provider system 140 receives the selected option (Step 450) and provides the requested service configured for the selected option (Step 460).

Advantageously, communication network 100 allows for dynamically providing service options based on access state information to end-users in an interactive manner. In particular, either the device or the access system monitors for and provides access state information on the access links to the service provider. The service provider then provides the end-user with service options based on the access state information. The service is then configured and provided in accordance with the preference of the user.

Figure 5:
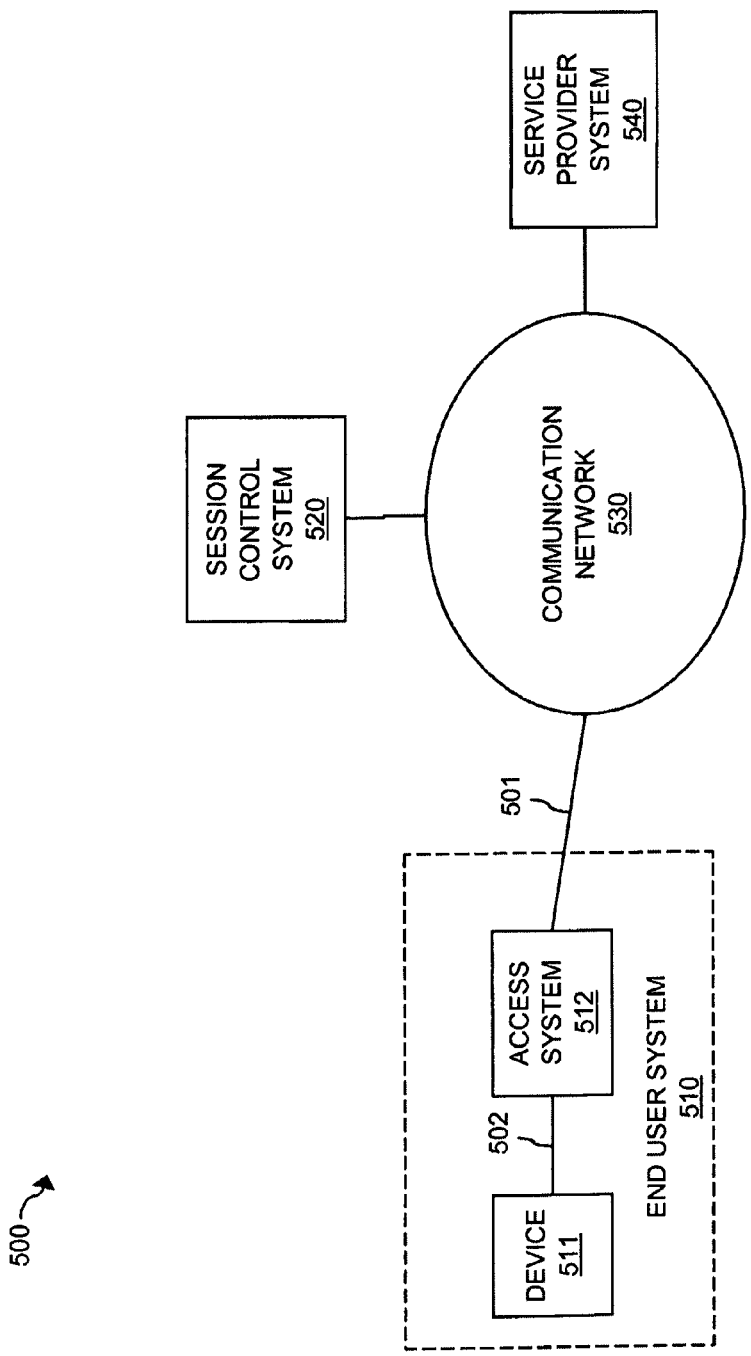
FIG. 5 illustrates a communication network in an embodiment of the invention.

FIG. 5 illustrates communication network 500 in an embodiment of the invention. Communication network 500 includes end-user system 510, communication network 530, session control system 520, and service provider system 540. End-user system 510 includes device 511 and access system 512. Device 511 is in communication with access system 512 by communication link 502. Access system 512 is in communication with communication network 530 by communication link 501. Session control system 520 is in communication with communication network 530. Likewise, service provider system 540 is in communication with communication network 530.

Service provider system 540 could be any system capable of providing a service to device 511 over communication network 530. A service could be, for example, a voice, video, audio, or data service. Session control system 520 could be any system capable of controlling service sessions between service provider system 540 and device 511. Access system 512 could be any system capable of providing device 511 with access to communication network 530. In an example, access system 512 could be a cable modem, a digital subscriber line (DSL) modem, or the like. Device 511 could be any device capable of communicating with session control system 520 and service provider system 540, such as a personal computing device, a personal digital assistant, or a mobile phone, as well as other types of devices. Alternatively, device 511 may communicate directly with communication network 530 without the use of access system 512 or session control system 520. Communication link 502 could be a wired or wireless link such as a CAT-5 cable, USB cable, or WiFi wireless connection. Communication link 501 could also be a wireline or wireless link For example, communication link 501 could comprise a DSL connection, fiber connection, cable connection, wire connection, or any other suitable wired connection using any suitable communications protocol, either alone or in combination with other links. The term "wired connection" refers to a connection that is not a wireless connection, and is not meant to exclude connections such as connections using optical fiber that do not include actual wire. In another example, communication link 501 could comprise a CDMA, MMDS, EVDO, WiMax link or other suitable wireless link using any suitable communications protocol, either alone or in combination with other links.

Figure 6:
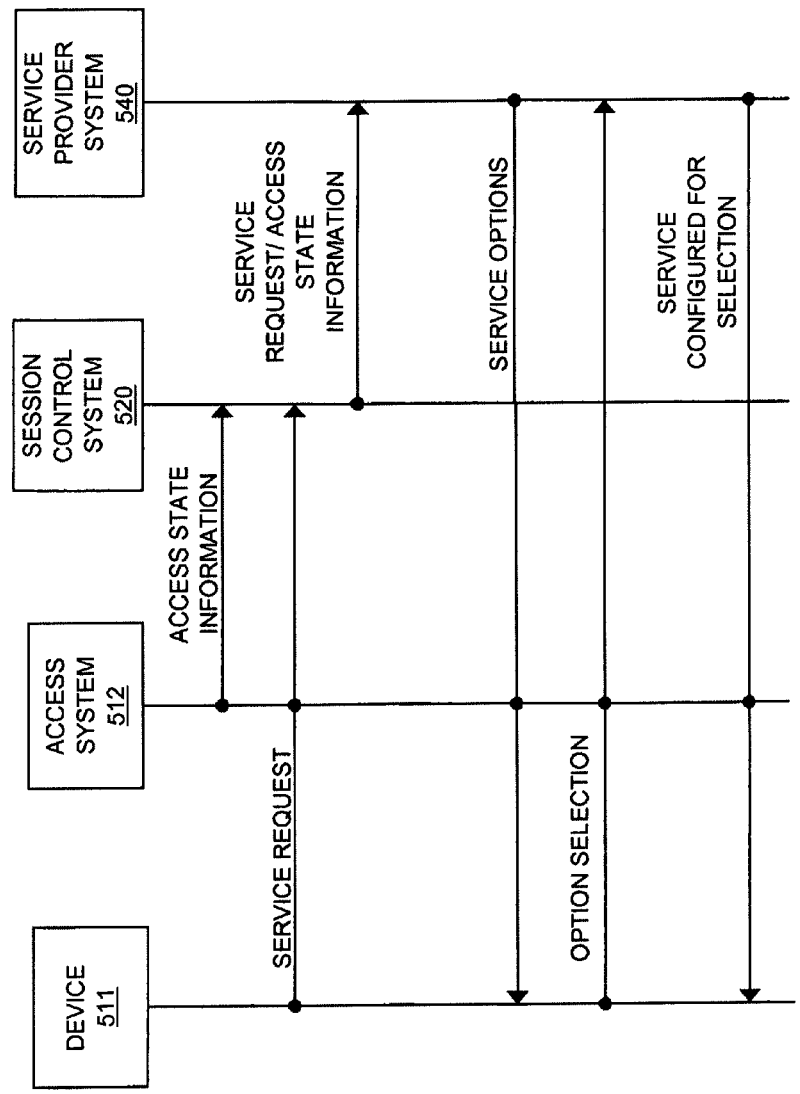
FIG. 6 illustrates the operation of a communication network in an embodiment of the invention.

FIG. 6 illustrates the operation of communication network 500 in an embodiment of the invention. In operation, device 511 communicates with access system 512 to gain access to communication network 530. Upon establishing the access, access system 512 monitors link 501. Access system 512 generates access state information pertaining to the health or status of link 501. Access system 512 could also monitor link 502 and could generate access state information pertaining to the health or status of link 502. Access system 512 actively transmits the access state information to session control system 520. Access system 512 could transfer the access state information periodically.

Next, device 511 transmits a service request for a service to session control system 520 identifying the service and device 511. In response to the service request, session control system 520 transfers a service request to service provider system 540 indicating device 511, the requested service, and the access state information. Service provider system 540 receives the service request from session control system 520 and responsively provides service options to device 511. Device 511 provides the options to a user for selection, such as via a graphical user interface. The user selects one of the service options and device 511 transmits the selected option to service provider system 540. Upon receiving the selected option, service provider system 540 provides the requested service configured for the option selection.

Figure 7:
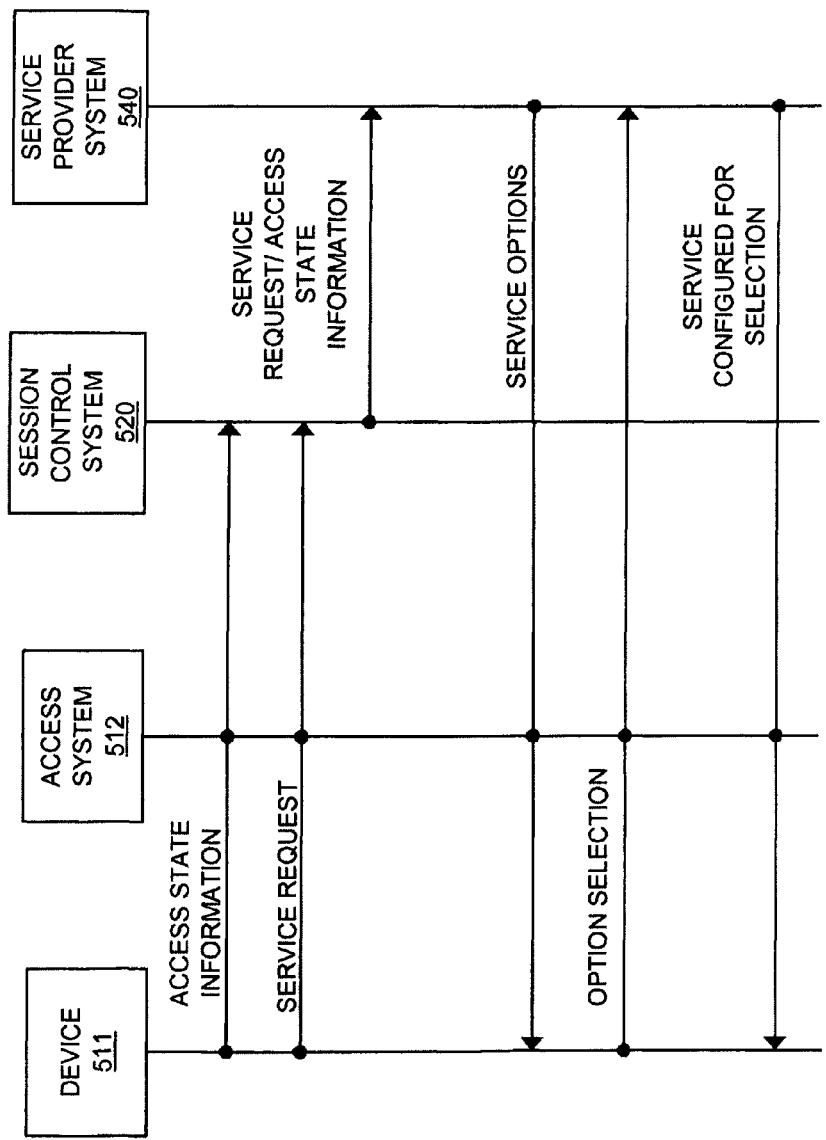
FIG. 7 illustrates the operation of a communication network in an embodiment of the invention.

FIG. 7 illustrates the operation of communication network 500 in an embodiment of the invention. In operation, device 511 communicates with access system 512 to gain access to communication network 530. Upon establishing the access, device 511 monitors link 502. For example, device 511 could monitor for the total bandwidth available over link 502. Device 511 could also monitor general performance statistics, such as packet jitter and packet delay. The performance results, such as jitter or delay, could be indicative of the performance of link 501, link 502, or communication network 530. Importantly, device 511 determines by monitoring and detection the state of the access at device 511, regardless of whether any degradation is caused by link 502, link 501, or communication network 530. Device 511 then generates access state information pertaining to the health or status of the access as perceived by device 511 and transmits the access state information to session control system 520.

Next, device 511 transmits a service request for a service to session control system 520 identifying the service and device 511. In response to the service request, session control system 520 transfers a service request to service provider system 540 indicating device 511, the requested service, and the access state information. Service provider system 540 receives the service request from session control system 520 and responsively provides service options to device 511. Device 511 provides the options to a user for selection, such as via a graphical user interface. The user selects one of the service options and device 511 transmits the selected option to service provider system 540. Upon receiving the selected option, service provider system 540 provides the requested service configured for the option selection.

Thresholds may be established that may be stored in device 511, access system 512, session control system 520, or service provider system 540. Such thresholds may be associated with data such as a particular signal strength, level of bandwidth availability, amount of jitter, length of delay or latency, packet loss, voice quality, or any other metric or indicator of current or predicted quality of service or performance of communication between device 511 and communication network 530 or another device or network node with which device 511 is communicating (any such data being referred to hereafter as "performance data", "line state", or "state of a communications link"). In such a manner, the quality of service and performance over both links 501 and 502 can be monitored and predicted both separately and in combination. Such thresholds may be established to be indicative of current or predicted quality of service or performance. Thresholds may be absolute thresholds or thresholds that are dynamically determined and modified. For example, a threshold may be established based on some level or type of performance data known to be associated with poor communication or some other characteristic of performance data. Alternatively, a threshold may be established based on previous performance data collected by device 511, either alone or in combination with a time stamp or elapsed period of time associated with the time such previous performance data was collected. In such a manner, trends in performance data associated with device 511 or links 501 and 502 may be utilized to track a deteriorating communication session or connection or predict a more serious issue such as a dropped connection or unacceptable level of packet loss or delay.

Performance data may be collected by any or all of device 511, access system 512, session control system 520, and service provider system 540. Some performance data may be better collected by particular elements of FIG. 5. For example, device 511 may collect the data that is most relevant to assessing the overall connection over links 501 and 502 in combination, as device 511 may be best situated to collect data most closely associated with how the user of such device 511 experiences the effects of data communicated over communication network 530, link 501, and link 502. Performance data may be compared to one or more thresholds or otherwise analyzed or modeled for purposes of monitoring or predicting quality of service or performance. Such comparison, analysis, monitoring, and prediction may be accomplished by device 511, access system 512, session control system 520, or service provider system 540, either alone or in combination.

If it is determined that one or more thresholds have been crossed by the collected performance data, one or more events may be initiated by any of the elements of FIG. 5. Such events may include call handling procedures, providing feedback to a user, and the presentation of options to a user as to how to proceed with a particular communications session. More particularly, a user maybe queried via device 511 if such user wants to make no changes, terminate or reinitiate a communications session or application, switch to another network mode (e.g., change from a WLAN to a cellular network), change a communications protocol, allocate a smaller amount of bandwidth to a particular application, change a CODEC utilized, batch a data transfer for later communication, queue a particular application or data transfer until performance conditions improve, or any other suitable change that may effect communication performance. Alternatively, an application may reside in device 511 or elsewhere in the elements of FIG. 5 to automatically make such determination based on rules or options previously established by a network administrator, service provider, or the user of device 511.

Figure 8:
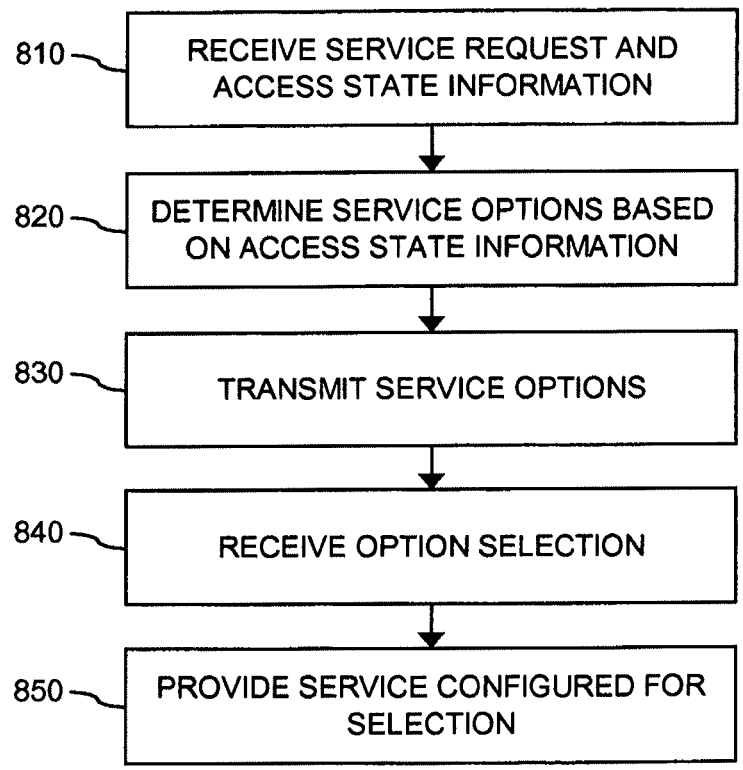
FIG. 8 illustrates the operation of a service provider system in an embodiment of the invention.

For example, a handheld wireless device may be progressively losing bandwidth due to a decline in signal strength. A user of the device may change geographic location, enter a structure, or enter a region with heavy user traffic or wireless interference. If a user is communicating using both voice and video, the device may prompt the user such that the user is alerted of the decline in signal strength and ask if such user would like to switch to voice only communications. Alternatively, the device may automatically drop the video connection or queue it until sufficient signal strength is reestablished. Further, if a video and voice session with two participants other than the user is being conducted, the device may automatically determine which of the video connections connecting the user to one of the two participants is to be terminated based on preference previously selected by the user. In fact, the user may elect to prioritize, rank or otherwise express a preference for packets associated with a video connection with party 1, an audio connection with party 1, a video connection with party 2, and an audio connection with party 2. The device may then terminate, queue, and reestablish such connections in accordance with the user's preferences as the signal strength of the connection of the user's device increases and decreases in strength. Although the above example is presented in terms of video and audio communications, it is equally applicable to the prioritization and selective termination and queuing of any applications communicating over a network FIG. 8 illustrates the operation of service provider system 540. To begin, service provider system 540 receives the service request from session control system 520 identifying device 511, the requested service, and the access state information (Step 810). Next, service provider system 540 determines service options based on the access state information (Step 820). For example, service provider system 540 could determine various possible codecs or protocols to use for the service based on the available bandwidth indicated in the access state information. Service provider system 540 transmits the service options to device 511 (Step 830) whereby a user selects one of the options. Service provider system 540 receives the selected option from device 511 (Step 840) and provides the service configured for the selected option (Step 850).

As illustrated, communication network 500 advantageously allows a service provider to dynamically interact with an end-user in order to optimally configure a requested service. In addition, communication network 500 provides for the forwarding of access state information on per-service request basis from a session control system to a service provider. In this manner, a device or an access system need not have awareness of a service provider while still allowing the service provider to use the access state information service optimization.

Figure 9:
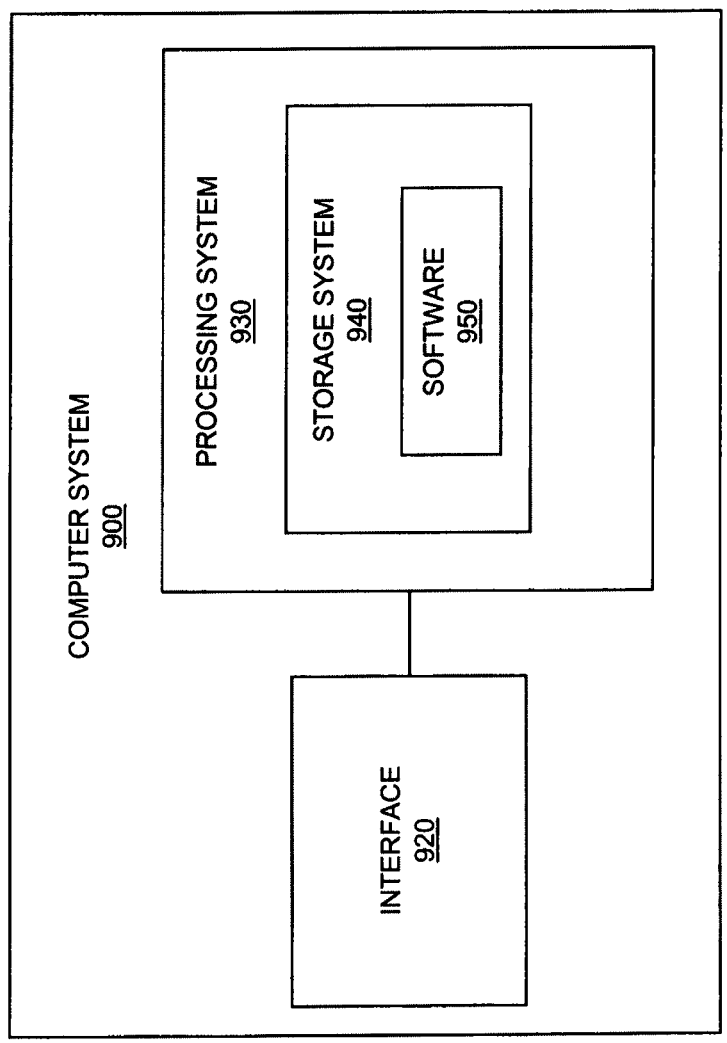
FIG. 9 illustrates a computer system implemented according to an embodiment of the invention.

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment maybe used. Computer system 900 may use a client server architecture where operations are distributed among a server system and client devices that together comprise elements 920-950.

Interface 920 could comprise a network interface card, modem, port, or some other communication device. Interface 920 may be distributed among multiple communication devices. Interface 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 maybe distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described above for the elements of communication network 100 or communication network 400.

Figure 10:
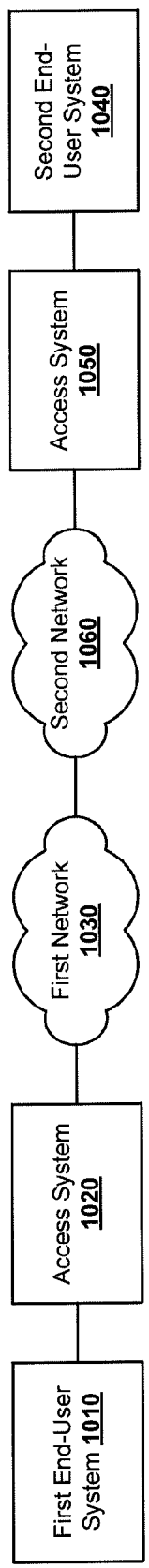
FIG. 10 illustrates one embodiment of the invention used in connection with two or more communication networks, each managed by a different provider of network services.

FIG. 10 illustrates one embodiment of the invention used in connection with two or more communication networks, each of which may be managed by a different provider of network services. More particularly, FIG. 10 illustrates a first end-user system 1010 accessing a communication network 1030 of a first provider of network services via a first access system 1012. FIG. 10 also illustrates a second end-user system 1040 accessing a second network 1060 of a second provider of network services via access system 1050. First network 1030 and second network 1060 may be directly connected or may be indirectly connected via any combination of networks or suitable network connections.

As illustrated, network 1030 may include an access point at which communications from end-user system 1010 are received at network 1030. For example, if network 1030 is a cellular network, access point 1070 may be an MSC or a GMSC. Similarly, network 1060 may include an access point 1080 providing similar functionality.

As previously described, end-user system 1010 may monitor performance data and thresholds as previously described relative to FIG. 5 in order to assess the quality of the connection such end-user system 1010 has with network 1030. End-user system 1010 may then communicate such performance data or the crossing of such thresholds to a node of network 1030 such as access point 1070 or any other suitable node of the network. Network 1030 may then further communicate the need to modify a communication session of such end-user system 1010 based on an indication of such performance data crossing any of such thresholds. More particularly, a packet may be generated and sent over network 1030 to network 1060 that indicates to network 1060 that a communication session conducted by end-user system 1010 needs to be modified or merely that such a threshold has been crossed. For example, such communication session may be conducted between end-user system 1010 and 1040.

Although such communication is described in the nomenclature of a packet, any suitable data communication between networks 1030 and 1060 may be utilized to signal network 1060 of the need to modify the communications session. As used herein, the terms modify and modification may be used to refer to a broad range of alternatives that may be selected in response to a change in the performance data or the crossing of a threshold, as each are associated with a particular communications session. For example, such a modification may include the call handling procedures, feedback, or options previously described relative to FIG. 5. Although FIG. 5 describes such options in terms of how things are presented or chosen by a user of an end-user system such as end-user system 1010, a modification may instead be determined automatically by a node of network 1030 or 1060 or a remote end-user device such as end-user system 1040. Such modification may include the termination or re-initiation of a communications session or application, the change in a mode of communications, a change in a communications protocol, a change in the amount of bandwidth used by a particular application, a change in a codec utilized, the queuing or batched transfer of data, or any suitable change that may improve or otherwise alter the communications session.

In one embodiment, such modification may include switching the communications session from one end-user device to another or from one communications network to another. For example, a communications session that is being conducted by a user using a personal digital assistant over a first data network can be switched to be conducted on a cellular network using a cellular telephone. Likewise, a communications session that is being conducted over a wireless land connection may instead be switched to be conducted over a DSL connection.

The decision as to how to modify a communications session may, as previously described, be affirmatively chosen by a user of one or more of the end-user devices being used in such communications session. Alternatively, such decision may be automatically made by a communications network or end-user device in response to the performance data received, the threshold crossed, the types of end-user systems available to end-users, the type of network access available to the end-users, the bandwidth, availability, quality of service, packet loss, jitter, latency, or any other performance data associated with alternatives with which the end-users may obtain network access and establish a network connection between the end-user devices of such end-users.

In one embodiment, the decision is made by a session controller of a network utilized by one of the end-users involved in a communications session. In one embodiment, such session controller may be session control system 520. More particularly, in response to receiving data associated with a decline in the quality of a connection to network A by end-user device A, a session controller of network B may make a change to a communications session between end-user device A and an end-user device B that is connected to network B. In one example of the embodiment, the session controller of network B may make such change in response to receiving data from end-user device A. In another embodiment of the example, the session controller of network B may make such change in response to a command generated by end-user device B. In yet another embodiment of the example, the session controller of network B may make such change in response to a preference previously indicated by end-user device B. Such preference may be an indication of bandwidth priority for a particular application, an indication of an alternative channel of communication, or any other suitable indication of desired change based on the circumstances of a particular communications session.

A packet or other signal or suitable data that is communicated between two different networks such as network 1030 and network 1060 may include information regarding the availability of a particular virtual channel, the amount of bandwidth that is available in such channel, a trigger indicative of a need or desire to modify a communications session, or any other suitable information indicative of a present or predicted change in the state of a particular network connection. The term state as used herein may be any status or change in the performance characteristics of any network connection that may affect the availability, quality, size, latency, or other characteristic capable of impacting the data communicated in a particular communications session. Such information maybe communicated for example, directly between the network access point of a first end-user in a first network and the network access point of a second end-user of a second network. In such a manner, either of the two network access points or end-user devices connected thereto may modify a communications session. Alternatively, such information may be communicated prior to or during call setup in order to determine how best to establish a communications session between an end-user of the first network and an end-user of the second network In an alternative embodiment, information regarding the state of a particular network connection of a first end-user to a first network may be communicated to a register or database maintained on either network or at a central location for storage and use when setting up and conducting future communication sessions involving such end-user. Such register or database may be used in Session Initiation Protocol, Bearer Independent Call Control, or SS7 call control schemes. Databases such as a Home Location Register (HLR) in a cellular network, an ENUM database in a Voice Over IP network or Policy Decision Function/Home Subscriber Server in an IMS network are currently utilized to monitor the current location of an end-user device and/or determine how best to route a call or data transfer to such end-user device based on the location of such end-user device in one or more communication networks.

Each of such databases have entries corresponding to end-users. Such entries may be supplemented according to the teachings of the present invention to include state information regarding the connection of such end-user device to the network and the quality or state thereof. For example, such database entry could include information regarding the availability of a virtual channel to such end-user device, the amount of bandwidth available to such end-user device's connection to the network, the best route of communication to such network device, preferences of an end-user with respect to call setup or a particular device or network to use for each of a plurality of applications such as voice, video, data, music, or any other suitable type of data or application.

FIG. 11 illustrates an entry in a network database such as an HLR, HSS, PDF, or ENUM database associated with an end-user. Database entry 1110 includes an identifier associated with an end-user device such as EIN number, serial number, telephone number, account number, or other suitable identifier associated with a subscriber or device. Database entry 1110 may also include a list of alternative end-user devices, together with the type of network associated with such end-user device. Certain end-user devices may be associated with one or more networks. For example, a home computer may be connected both to a DSL connection, cable modem connection, wireless LAN connection, and/or a traditional dial-up connection.

Thus, as illustrated in FIG. 11, user 1234 has four end-user devices indicated. More particular, user 1234 has a home computer, work computer, cellular telephone, and personal digital assistant. Each of such devices is associated with particular networks. Each of such devices are further associated with parameters such as available applications, available bandwidth, available protocols, and user preferences. User preferences may include the election by a user to have a particular end-user device and/or network connection utilized when receiving data of a particular format or that is utilized by a particular application. For example, a user may indicate that any video data is first sent to his home computer and then to a cellular telephone if a connection to the home computer is not available. Alternatively, a user or network may set preferences based on time of day or the current location of the end-user.

Each of the network connections illustrated in FIG. 11 may also have fields associated with performance data that is periodically updated to reflect the current state of the end-user's access using such network connection. For example, an end-user device may periodically send performance data to such database indicative of the state of that device's connection to the network The end-user device may indicate the amount of bandwidth available over such end-user device's connection to the network, the amount of latency experienced by such device, or any other piece of information relevant to the operation of a network connection or the performance thereof previously described in this application.

In one embodiment of the present invention, in setting up a communications session with a user, prior to setup of such communications session, a database entry such as the one illustrated in this FIG. 11 may be consulted to determine the best way of conducting such communications session with the end-user. For example, an HLR or PDF may be consulted to determine the network connection to the end-user that has the most available bandwidth. In response to such determination, a call setup, or other establishment of a communications session may proceed with the particular network device and particular network connection associated with the most available bandwidth. In an alternative embodiment, the same decision may be made to establish the network connection with the least latency, least jitter, or highest likelihood of reaching an end-user based on the location of a particular end-user, the time of day, the day of the week, or any other suitable piece of information.

Figure 12:
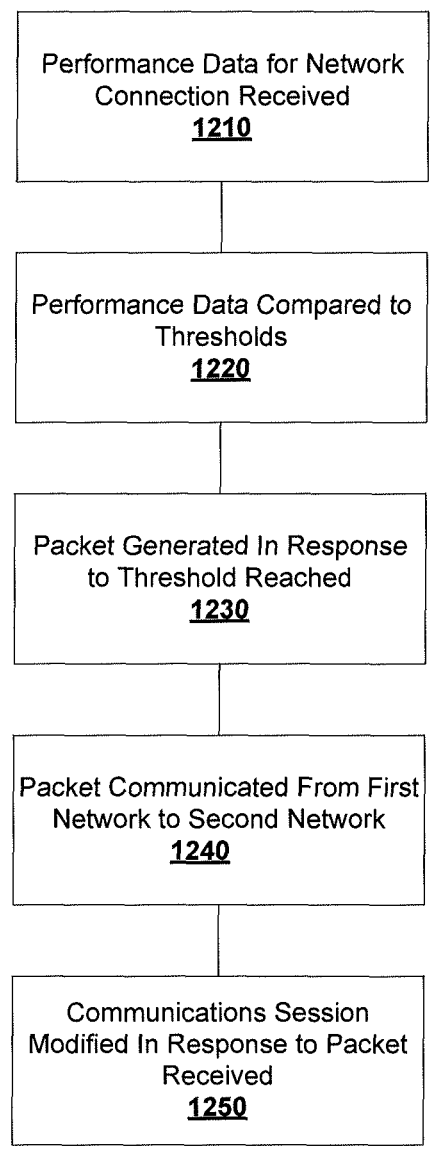
FIG. 12 illustrates one embodiment of a method of modifying a communications session implemented according to the teachings of the present invention.

FIG. 12 illustrates one embodiment of a method implemented according to the teachings of the present invention. In step 1210, performance data associated with a network connection is received. In step 1220, such performance data is compared to one or more thresholds. In step 1230, a packet is generated in response to comparing the performance data to the one or more thresholds. In step 1240, the packet is communicated from the network of one service provider to the network of a second service provider. In step 1250, the network of the second service provider modifies a communications session in response to receiving the packet.

In one example of the method illustrated in FIG. 12, a consumer purchases or selects a streaming video from an online content provider using an end-user device. The provider selects a particular codec with which to provide the streaming video based on the then current bandwidth available between the end-user device and a network access point. If the quality of the connection between the end-user device and the network access point deteriorates past a particular threshold such as a decline in available bandwidth or an increase in packet loss, the provider may be sent an indication that such threshold has been reached by the end-user device or the network access point. In response to receiving such indication, the provider may alter the codec being utilized, increase the amount of data queued before the video is displayed by the end-user device, or communicate to the end-user device that the provider believes the connection may soon be lost or deteriorate to such a degree that the streaming video will be unviewable by a user of the end-user device.

Figure 13:
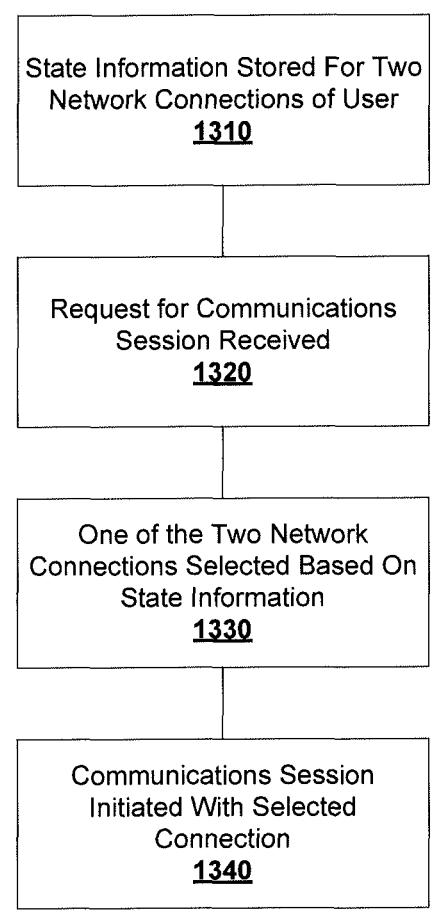
FIG. 13 illustrates one embodiment of a method of selecting an end-user device implemented according to the teachings of the present invention.

FIG. 13 illustrates one embodiment of a method implemented according to the teachings of the present invention. In step 1310, information regarding the state of at least two network connections associated with a particular end-user is stored in a database. In step 1320, a request to initiate a communications session with the particular end-user is received. In step 1330, one of the two network connections is selected in response to comparing the information associated with the performance of each of the network connections. In step 1340, a communications session is initiated over the selected network connection. In one embodiment, the selection of the network connection may be rejected based on a characteristic of the end-user device associated with network connection. For example, a selection may be rejected because a cell phone battery is low, because it does not support a particular format, because the end-user device is only indicated as being accessible during certain times, or because an end-user has indicated that he does not wish to utilize a particular application on such end-user device.

Various embodiments of the present invention allow a remote network or remote end-user device to control, change or terminate a communications session based on the state of a network connection between another end-user device and another network In such a manner, a complete connection between two end-users that crosses networks of different service providers can be monitored in an end-to-end fashion. More particularly, one end-user's local access to a network can be modified and taken into account by another end-user even if the two end-users access a network such as the internet or a global telephone network through different service providers. The communication of a packet, signal or other data between such networks that is indicative of a particular end-user's local access and the quality thereof can therefore be taken into account during not only call setup or session initiation, but also on a continuous basis during a call or communications session, and actions may be taken to improve the performance of such communication and/or modify the way such communication is conducted in order to enhance the performance of the overall connection between the two end-users.

Figure 14:
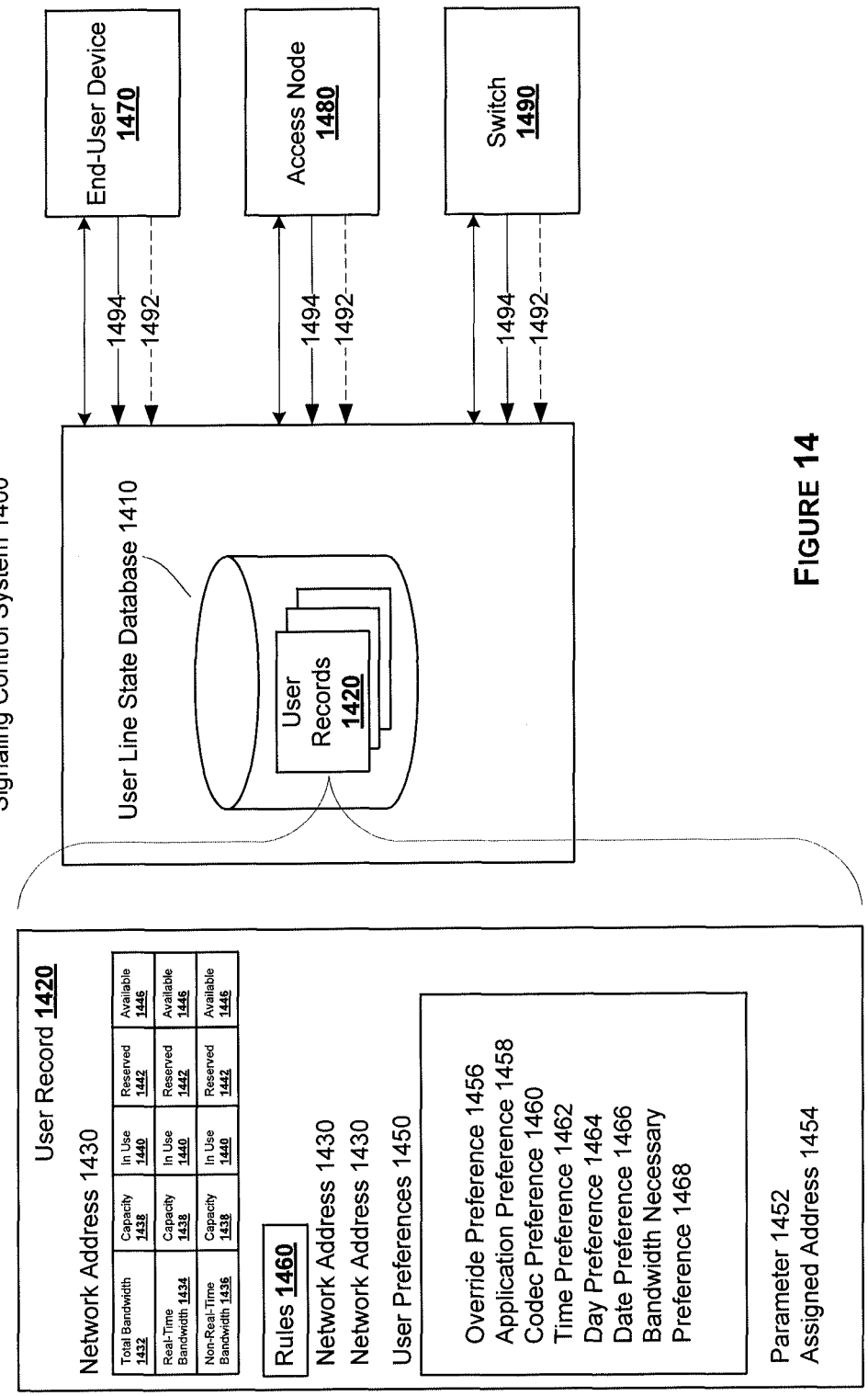
FIG. 14 illustrates one embodiment of a signaling control system implemented according to the teachings of the present invention.

FIG. 14 illustrates one embodiment of a signaling control system 1400 implemented according to the teachings of the present invention. Signaling control system 1400 is a system for managing control signals utilized to set up communications session between clients of a network. In one embodiment, signaling control system 1400 may be an Information Management System (IMS) for an IP multi-media network. Such signaling control system 1400 maybe a separate component of an IMS system that controls access facilities such as a Resource Admission and Control Sub-system (RAC-S), sometimes referred to in whole or in part as a Resource Admission and Control Function or Resource Admission and Control Facility (in each case RAC-F). In yet another embodiment, signaling control system 1400 may be a signaling control point, home location register, or other appropriate network device suitable for storing line state data associated with a particular end-user device or network address of an end-user. Although specific embodiments of signaling control system 1400 are identified herein, signaling control system 1400 may be any network device or portion of a network device wherein it maybe useful to maintain the current line state of a particular end-user device or network address connected to a network Signaling control system 1400 includes a user line state database 1410. User line state database 1410 may be embedded within signaling control system 1400 as illustrated or included in a separate network device in communication with signaling control system 1400. User line state database 1410 includes a plurality of user records 1420. Each user record 1420 includes information regarding the current status of a line state or transmission state of a connection between a network address associated with a particular end-user device and an access node or switch, gateway, or edge node of a network User record 1420 includes line state or transmission state information for the network connections of one or more network addresses 1430 associated with user record 1420. Hereafter, line state may be used to refer to either line state or transmission state. For example, each network address 1430 may include line state information associated with a total bandwidth 1432, a real time bandwidth 1434, and a non-real time bandwidth 1436. For each of the foregoing categories of bandwidth, the user record 1420 may include the overall capacity 1438 of a particular network connection utilized by network address 1430, the amount of such bandwidth in use 1440, the amount of such bandwidth reserved 1442, and the amount of such bandwidth currently and actually available 1444.

User record 1420 may also include user preferences 1450 for a particular end-user. For example, user preferences 1450 may include an override preference 1456 wherein an end-user or network administrator may specify a preferred network address for such end-user, or a hierarchy of addresses that specifies an order in which such network addresses should be utilized in order to set up a communications session with a particular end-user. Such override preference 1456 may be enabled at certain times to disregard other preferences of the user. User preferences 1450 may also include an application preference 1458 wherein a user may specify a particular network address to be used for a particular application. For example, an end-user may specify a particular network address for voice communications, and another network address for video content applications. User preferences 1450 may also include a codec preference 1460 wherein an end-user may specify a particular network address based on the codec being used to deliver video or audio content to such end-user. User preferences 1450 may include a time preference 1462, a day preference 1464, and a date preference 1466, each specifying that a particular network address be utilized when a communications session is desired to be set up at a particular time, day, and/or date.

User preferences 1450 may also include a bandwidth necessary preference 1468, wherein an end-user can specify a particular network address to be utilized based on the amount of bandwidth required for a particular communications session or application used therein. In such a manner, bandwidth necessary preference 1468 may, in one embodiment, be a table specifying different network addresses to be utilized based on a particular range of bandwidth in which the bandwidth required for a particular communications session falls.

In one embodiment, each network address 1430 may be associated with a particular end-user device, such that a network address may be selected based on a particular user preference 1450 that is selected based on the user interface of the end-user device located at such network address 1430. For example, a user may indicate a preference for a network address associated with a television or personal computer for video communications sessions requiring a large degree of bandwidth, and hence higher resolution. Such same user may indicate a preference 1450 for a cell phone if a lower resolution video communications session is desired based on the codec being utilized or the bandwidth necessary for such a connection. In another embodiment, an end-user device may be associated with more than one network address 1430. For example, a cell phone may have a network address on a cellular network and a network address on a wireless LAN network In such a manner, the cell network address may be selected as a user preference 1450 for a real time application and a network address 1430 for a wireless LAN network may be selected for a non-real time application. Similarly, a personal computer may be connected to two different networks such as a wireless LAN network and a DSL or cable modem network.

User preferences 1450 can be utilized to compose rules 1460 for each network address 1430 or for an overall end-user. For example, a decision tree can be utilized based on the parameters of a communications session and the applications to be utilized therein and the current line state or transmission state of each network address 1430. For example, a video may be broadcast in a communications session based on a combination of the application utilized, the codec utilized, the date, day, and time for the communications session, the bandwidth necessary for the video download, the real time or non-real time bandwidth available, or other factors associated with a particular communications session, application, end-user, network address, or indication of user preference. Although not illustrated herein, user record 1420 may include additional line state or transmission state information for a particular network address 1430 such as latency, packet loss, jitter, or any other suitable indicia of the current performance or operation of a link between a particular end-user device and a network node or other device.

Signaling control system 1400 may be in direct or indirect communication with an end-user device 1470, an access node 1480, and a switch 1490. End-user device 1470 may be a telephone, PDA, personal computer, television, or any other suitable end-user device. Access node 1480 may be any node or gateway to any telecommunications network Switch 1490 may be any switch, router, control point, transfer point, or other suitable network element. Each of end-user device 1470, access node 1480, and switch 1490 may send periodic updates to signaling control system 1400 to provide user line state database 1410 with updated information regarding the line state associated with any particular network address. In one embodiment, such updates may include timed triggers 1492 that are sent at regular or irregular intervals. For example, line state may be updated at intervals of every 0.1 seconds, one second, one minute, five minutes, half hourly, or hourly. Additionally, forced updates 1494 may he communicated to signaling control system 1400 by end-user device 1470, access node 1480, or switch 1490 based on the occurrence of a particular event or circumstance such as one of the previously described thresholds being reached with respect to available bandwidth, latency, packet loss, jitter, or any other suitable indicia of the performance or status of a particular link between an end-user device and a network or element of such network In another embodiment of the present invention, a system is disclosed for tracking the end-user device line transmission state in session controllers such as soft switches. The state information is then used for enhanced call handling. In cases where end user devices have multiple connectivity methods, the session controller tracks both line states for call handling decisions.

In yet another embodiment of the present invention, the session controller also communicates the line state information to other session controllers for call handling via inter-switch signaling protocol applications such as SS7, BIC, SIP, SIP-T, and other inter-switch signaling for call handling.

In yet another embodiment of the present invention, the session controller, and end-user devices can communicate their respective user line state to signaling control points, HLRs, ENUM servers, and other Advanced Intelligent Network devices for advanced call handling.

In yet another embodiment of the present invention, the signaling control platforms may track multiple end-user line states, and use those states to make call signaling decisions for those users at multiple locations and monitor connection quality during call handling and call control signaling.

In yet another embodiment of the present invention, the invention would be integrated in the Policy Decision Function (PDF) and/or Home Subscriber Server (HSS) function in a network designated as an IP Multimedia Subsystem (IMS). These functions would monitor the line state of the subscriber and determine appropriate bandwidth or coding requirements for the call session. Within the IMS architecture, this information would also be used to communicate to other IMS platforms to negotiate with the other platform to determine correct bandwidth or coding requirements for the end user to end user session.

Although particular embodiments of the present invention have been explained in detail, it should be understood that various changes, substitutions, and alterations can be made to such embodiments without departing from the spirit and scope of the present invention as defined solely by the following claims.

What is claimed:

1. A method of monitoring a link in a network between a first end-user device and a network, the method comprising:
receiving, at a receiving device, performance data collected by the first end-user device, the performance data indicating a communication quality of the link between the first end-user device and the network;

determining that a threshold has been reached based on the received performance data, the threshold associated with a decline in quality of the link;

transmitting a query to the first end-user device in response to the determined reaching of the threshold, the query requesting from a user of the first end-user device a communication action to perform based on the threshold being reached;

receiving the communication action from the first end-user device, the communication action auto-generated by the first end-user device based on previously established preferences, wherein the previously established preferences prioritizes communications of one or more parties in communications with the first end-user device and prioritizes modes of connections with the one or more parties in communications with the first end-user device;

determining whether a change is to be made to a communication session between the first end-user device and the network based on the received communication action specified by the user of the first end-user device;

responsive to a determination that a change to is to be made to the communication session based on the received communication action, changing the communications session between the first end-user device and the network in accordance with the received communication action, wherein changing the communications session between the first end-user device and the network includes switching the communications session from the first end-user device and the network to the first end-user device and a second network, the second network selected based on the previously established preferences; and responsive to a determination that a change to the communication session is not to be made based on the received communication action, maintaining the communications session between the first end-user device and the network unchanged.

2. The method of claim 1, and further comprising receiving a command entered by a user of the first end-user device.

3. The method of claim 1, wherein the communication action is preselected by the user of the first end-user device.

4. The method of claim 1, wherein determining that the threshold has been reached comprises determining that an amount of bandwidth has been reached.

5. The method of claim 1, wherein determining that the threshold has been reached comprises determining that an amount of packet loss has been reached.

6. The method of claim 1, wherein determining that the threshold has been reached comprises determining that an amount of jitter has been reached.

7. The method of claim 1, wherein the link between the first end-user device and the network is a wired connection link and the performance data indicating the communication quality of the wired connection link between the first end-user device and the network.

8. The method of claim 1, wherein changing the communications session comprises terminating the communications session and initiating a new communications session between the first end-user device and the second network.

9. The method of claim 1 wherein the threshold is established based on previous performance data collected by the first end-user device.

10. A system for monitoring a link in a network between a first end-user device and a network, the system comprising:

a communication interface for receiving performance data collected by the first end-user device, the performance data indicating a communication quality of the link between the first end-user device and the network;

a processor configured to execute instructions to:

determine that a threshold has been reached based on the received performance data, the threshold associated with a decline in quality of the link, the decline in quality being associated with a decline in quality applicable to multiple sessions communicated on at least a portion of the link; and transmit a query to the first end-user device in response to the determined reaching of the threshold, the query requesting from a user of the first end-user device a communication action to perform based on the threshold being reached;

receiving, using the communication interface, the communication action from the first end-user device, the communication action auto-generated by the first end-user device based on previously established preferences, wherein the previously established preferences prioritizes communications of one or more parties in communications with the first end-user device and prioritizes modes of connections with the one or more parties in communications with the first end-user device;

wherein the processor is further configured to execute instructions to:

determine whether a change is to be made to a communication session between the first end-user device and the network based on the received communication action specified by the user of the first end-user device;

responsive to a determination that a change to is to be made to the communication session based on the received communication action, change the communications session between the first end-user device and the network in accordance with the received communication action, wherein changing the communications session between the first end-user device and the network includes switching the communications session from the first end-user device and the network to the first end-user device and a second network, the second network selected based on the previously established preferences; and responsive to a determination that a change to the communication session is not to be made based on the received communication action, maintain the communications session between the first end-user device and the network unchanged.

11. The system of claim 10, and further comprising receiving, using the communication interface, a command entered by a user of the first end-user device.

12. The system of claim 10, wherein the communication action is preselected by the user of the first end-user device.

13. The system of claim 10, wherein determining that the threshold has been reached comprises determining that an amount of bandwidth has been reached.

14. The system of claim 10, wherein determining that the threshold has been reached comprises determining that an amount of packet loss has been reached.

15. The system of claim 10, wherein determining that the threshold has been reached comprises determining that an amount of jitter has been reached.

16. The system of claim 10, wherein the link between the first end-user device and the network is a wired connection link and the performance data indicating the communication quality of the wired connection link between the first end-user device and the network.

17. The system of claim 10, wherein changing the communications session comprises terminating the communications session and initiating a new communications session between the first end-user device and the second network.

* * * * *